(12) United States Patent
Aoki (10) Patent No.: US 8,964,631 B2
(45) Date of Patent: Feb. 24, 2015

(54) COMMUNICATION APPARATUS, CONTROL METHOD FOR COMMUNICATION APPARATUS, AND STORAGE MEDIUM

(75) Inventor: Hitoshi Aoki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 13/281,979

(22) Filed: Oct. 26, 2011

(65) Prior Publication Data

US 2012/0113879 A1    May 10, 2012

(30) Foreign Application Priority Data

Nov. 4, 2010  (JP) ................................. 2010-247840

(51) Int. Cl.
| | | |
|---|---|---|
| H04B 7/185 | (2006.01) | |
| H04B 7/00 | (2006.01) | |
| H04L 12/12 | (2006.01) | |
| H04L 1/16 | (2006.01) | |
| H04W 52/02 | (2009.01) | |
| H04W 28/04 | (2009.01) | |
| H04W 28/06 | (2009.01) | |

(52) U.S. Cl.
CPC .............. *H04L 12/12* (2013.01); *H04L 1/1614* (2013.01); *H04W 52/0229* (2013.01); *H04W 52/0264* (2013.01); *H04W 28/04* (2013.01); *H04W 28/06* (2013.01); *Y02B 60/50* (2013.01)
USPC .......................................... 370/318; 455/522

(58) Field of Classification Search
CPC .. H04W 52/00; H04W 52/02; H04W 28/0221
USPC .......................................... 370/318; 455/522
See application file for complete search history.

(56) References Cited

U.S. PATENT DOCUMENTS

| | | | | |
|---|---|---|---|---|
| 6,463,307 | B1 * | 10/2002 | Larsson et al. ................ | 455/574 |
| 2008/0095091 | A1 * | 4/2008 | Surineni et al. ............... | 370/311 |
| 2009/0040954 | A1 * | 2/2009 | Usuba ........................... | 370/311 |

(Continued)

FOREIGN PATENT DOCUMENTS

| | | |
|---|---|---|
| CN | 1323495 A | 11/2001 |
| CN | 1894921 A | 1/2007 |

(Continued)

OTHER PUBLICATIONS

Office Action issued on Nov. 22, 2013, in counterpart Chinese Application No. 201110344633.0.

(Continued)

*Primary Examiner* — Shaq Taha
(74) *Attorney, Agent, or Firm* — Carter, DeLuca, Farrell & Schmidt, LLP (57) ABSTRACT

A communication apparatus which is configured to receive a plurality of frames continuously transmitted or a plurality of frames transmitted as one frame from a transmission apparatus, the apparatus comprising: control unit adapted to control communication processing with the transmission apparatus; switching unit adapted to switch between a power saving mode of reducing power consumption by stopping a predetermined function and a normal mode of also making the predetermined function operate; and request unit adapted to request the transmission apparatus to stop transmitting the plurality of frames continuously transmitted or the plurality of frames transmitted as the one frame, when the switching unit switches from the normal mode to the power saving mode.

12 Claims, 9 Drawing Sheets

(56) References Cited

U.S. PATENT DOCUMENTS

2010/0080173 A1* 4/2010 Takagi ............................ 370/328
2012/0084397 A1* 4/2012 Shinohara ...................... 709/217

FOREIGN PATENT DOCUMENTS

| CN | 101006684 A | 7/2007 |
| CN | 101064650 A | 10/2007 |
| CN | 101193016 A | 6/2008 |
| CN | 101529824 A | 9/2009 |
| JP | 2003517741 A | 5/2003 |
| JP | 2006-238320 A | 9/2006 |
| JP | 2007006327 A | 1/2007 |
| JP | 2007124249 A | 5/2007 |
| WO | 00/10353 A | 2/2000 |
| WO | 2006/021847 A | 3/2006 |
| WO | 2007/085948 A | 8/2007 |

OTHER PUBLICATIONS

European Search Report for European Appln. No. 11008271.6 issued on Mar. 6, 2012.

Japanese Office Action issued on Aug. 1, 2014, in counterpart Japanese Application No. 2010-247840.

Chinese Office Action issued on Jul. 9, 2014, in counterpart Chinese Application No. 201110344633.0.

Office Action issued on Oct. 30, 2014, in counterpart Chinese Application No. 201110344633.0.

\* cited by examiner

FIG. 3A
ADDBA Request

| Category Code (=3 : Block Ack) | Action (=0 : ADDBA Request) | Dialog Token | Block Ack Parameter Set | Block Ack Timeout Value | Block Ack Starting Sequence Control |

| Reserved | Block Ack Policy | TID | Buffer Size |

FIG. 3B
ADDBA Response

| Category Code (=3 : Block Ack) | Action (=1 : ADDBA Response) | Dialog Token | Status Code | Block Ack Parameter Set | Block Ack Timeout Value |

| Reserved | Block Ack Policy | TID | Buffer Size |

FIG. 3C
DELBA

| Category Code (=3 : Block Ack) | Action (=2 : DELBA) | DELBA Parameter Set | Reason Code |

| Reserved | Initiator | TID |

FIG. 9

COMMUNICATION APPARATUS, CONTROL METHOD FOR COMMUNICATION APPARATUS, AND STORAGE MEDIUM

BACKGROUND OF THE INVENTION

1. Field of the Invention

The present invention relates to a communication apparatus which communicates with another apparatus in a power saving mode, a method of controlling the communication apparatus, and a storage medium.

2. Description of the Related Art

Recently, many wireless LAN devices complying with IEEE802.11 standard have been commercialized and used. IEEE802.11e standard supports Block Ack to improve the channel use efficiency on the physical layer. Block Ack is designed to collectively confirm receipt of a plurality of frames, unlike the prior art in which an Ack (acknowledgement) is returned in response to one frame. This technique allows to continuously transmit a plurality of frames instead of waiting for an Ack every time one frame is transmitted. In addition, IEEE802.11n standard supports aggregation, which is a technique of aggregating a plurality of MAC frames and transmitting them to implement high-speed transmission. A-MPDU (aggregation-MAC protocol data unit) which aggregates frames for each MPDU uses Block Ack to confirm receipt of each of aggregated frames. Using Block Ack allows to confirm receipt of aggregated MPDU subframes.

Recently, various kinds of product devices have been required to reduce power consumption. In order to reduce power consumption during a waiting time, some communication devices have a power saving mode designed to reduce power consumption by turning off blocks which are not associated with communication control until a request is issued from another communication device on the network. Such a communication device reduces power consumption by being set in the power saving mode during a waiting time, and switches to the normal mode, in which blocks other than a communication control unit are turned on, to execute predetermined processing in response to a request from another network device. In the power saving mode, since some circuits are turned off to reduce power consumption, limitations are imposed on the resources that can be used. In addition, to switch from the power saving mode to the normal mode, it is necessary to turn on another control unit. In some cases, therefore, it takes a predetermined time until the device switches to the normal mode.

When such a communication device receives an aggregation frame in the power saving mode, the device may lose frames. That is, if the storage area which can be used in the power saving mode is small, the device may not be able to store aggregation frames which are sequentially received. When receiving frames upon switching to the normal mode, it takes time to switch to the normal mode, and hence there is a chance that some aggregated frames will be lost during the switching time. Assume that Block Ack defined in IEEE802.11e is to be used. In this case as well, when a plurality of frames is continuously transmitted expecting Block Ack from the receiving side, there is a chance that the receiving side will lose frames.

Japanese Patent Laid-Open No. 2003-517741 discloses a technique of making a communication apparatus issue a request to enter the power saving mode to a base station before switching to the power saving mode so as to make the base station respond, on behalf of the communication apparatus, to a connectivity test message from another apparatus during the power saving mode.

Japanese Patent Laid-Open No. 2006-238320 discloses a technique of taking the statistics of the histories of time information of data frames received by a communication apparatus and deciding, based on the statistics result, whether the communication apparatus operates in the power saving mode.

In some cases, however, when an aggregation frame is transmitted or frames are continuously transmitted to a communication apparatus in the power saving mode, frame loss occurs.

In consideration of the above problem, the present invention provides a technique of reducing the loss of an aggregation frame or frames continuously transmitted while allowing an apparatus which is to be set in the power saving mode to maintain the power saving mode.

SUMMARY OF THE INVENTION

According to one aspect of the present invention, there is provided a communication apparatus which is configured to receive a plurality of frames continuously transmitted or a plurality of frames transmitted as one frame from a transmission apparatus, the apparatus comprising: a control unit adapted to control communication processing with the transmission apparatus; a switching unit adapted to switch between a power saving mode of reducing power consumption by stopping a predetermined function and a normal mode of also making the predetermined function operate; and a request unit adapted to request the transmission apparatus to stop transmitting the plurality of frames continuously transmitted or the plurality of frames transmitted as the one frame, when the switching unit switches from the normal mode to the power saving mode.

According to another aspect of the present invention, there is provided a control method for a communication apparatus which is configured to receive a plurality of frames continuously transmitted or a plurality of frames transmitted as one frame from a transmission apparatus, the method comprising: a control step of controlling communication processing with the transmission apparatus; a switching step of switching between a power saving mode of reducing power consumption by stopping a predetermined function and a normal mode of also making the predetermined function operate; and a request step of requesting the transmission apparatus to stop transmitting the plurality of frames continuously transmitted or the plurality of frames transmitted as the one frame, when the normal mode is switched to the power saving mode in the switching step.

Further features of the present invention will be apparent from the following description of exemplary embodiments with reference to the attached drawings.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
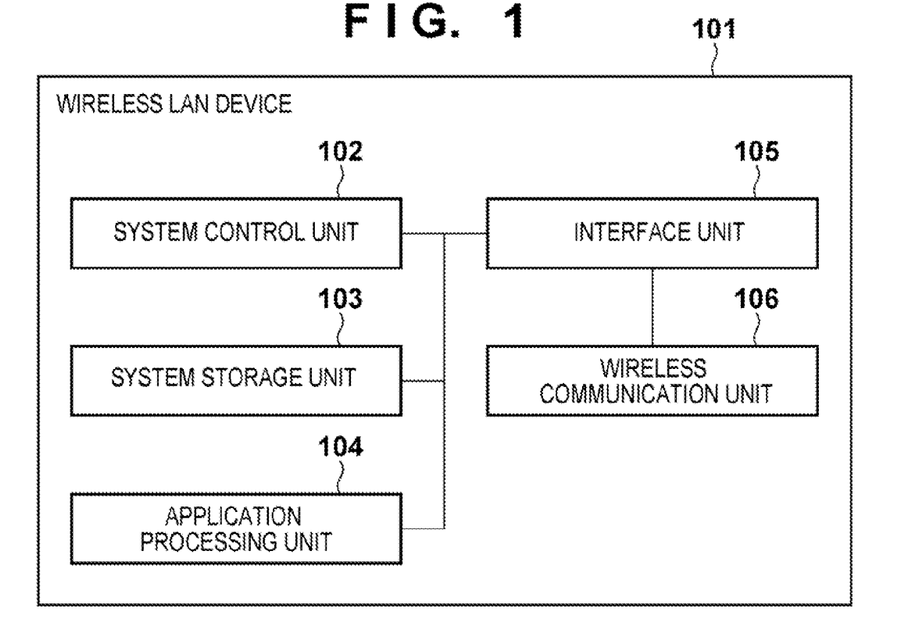
FIG. 1 is a block diagram showing the arrangement of a wireless LAN device according to the first or second embodiment.

FIG. 1 shows the arrangement of a wireless LAN device 101. The wireless LAN device 101 is a communication device capable of performing wireless LAN communication based on IEEE802.11n standard. The wireless LAN device 101 includes a system control unit 102, a system storage unit 103, an application processing unit 104, an interface unit 105, and a wireless communication unit 106.

The system control unit 102 is a CPU which controls the overall wireless LAN device 101 by executing programs stored in the system storage unit 103. The system storage unit 103 is a RAM for storing programs to be executed by the system control unit 102 and data necessary to execute the programs. The system storage unit 103 includes a reception buffer having enough size to receive a plurality of frames continuously transmitted or a plurality of aggregation frames.

The application processing unit 104 is a hardware apparatus which is controlled by the system control unit 102 to implement the application function of the wireless LAN device 101. If, for example, the wireless LAN device 101 is a wireless LAN printer, application processing corresponds to printing, and the application processing unit 104 corresponds to a print engine.

The wireless communication unit 106 is a wireless LAN adapter or a wireless LAN card, and controls the data link layer and physical layer in IEEE802.11n.

The interface unit 105 is an interface for connecting the system control unit 102 to the wireless communication unit 106. If the wireless communication unit 106 is a wireless LAN adapter having a USB interface, the interface unit 105 is a USB interface. Likewise, if the wireless communication unit 106 is a PCI Express type wireless LAN card, the interface unit 105 is a PCI Express interface. The system control unit 102 controls the wireless communication unit 106 via the interface unit 105.

A network in which the wireless LAN device 101 is participating will be described next with reference to FIG. 2. The wireless LAN device 101 is participating in a network 203, and communicates with a PC 202 via an access point 201.

The wireless LAN device 101 functions in either the normal mode or the power saving mode designed to reduce the power consumptions of predetermined functions (for example, functions other than those associated with communication processing), by turning off blocks which are not associated with communication control. The wireless LAN device 101 switches to the power saving mode when no communication occurs from the access point 201 or the PC 202 for a predetermined period of time. When communication occurs from the access point 201 or the PC 202, the wireless LAN device 101 operates upon switching from the power saving mode to the normal mode, as needed.

The details of the operation of the wireless LAN device 101 in the normal mode will be described.

In the wireless LAN device 101 in normal mode, the system control unit 102 controls the wireless communication unit 106 and performs processing on the communication layer higher than the data link layer, thereby performing communication processing between the access point 201 and the PC 202. In response to a processing request from the PC 202, the wireless LAN device 101 controls the application processing unit 104 to execute application processing.

Figure 3A:
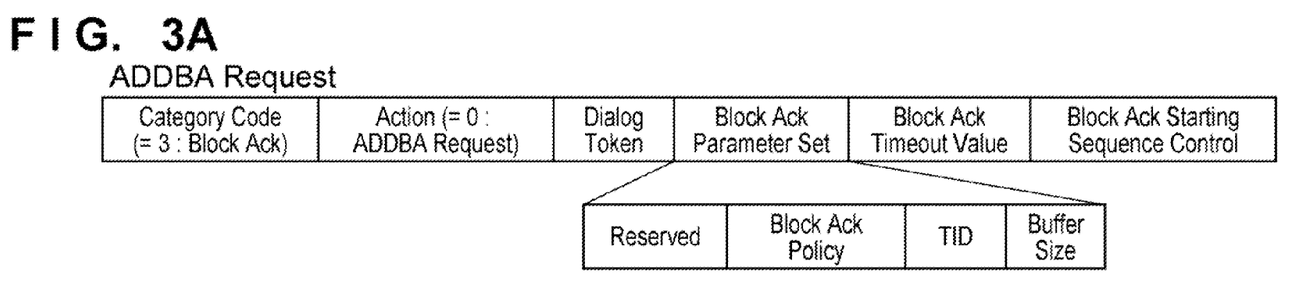
FIGS. 3A to 3C are views showing part of Action Frame defined in IEEE802.11e.
Figure 3B:
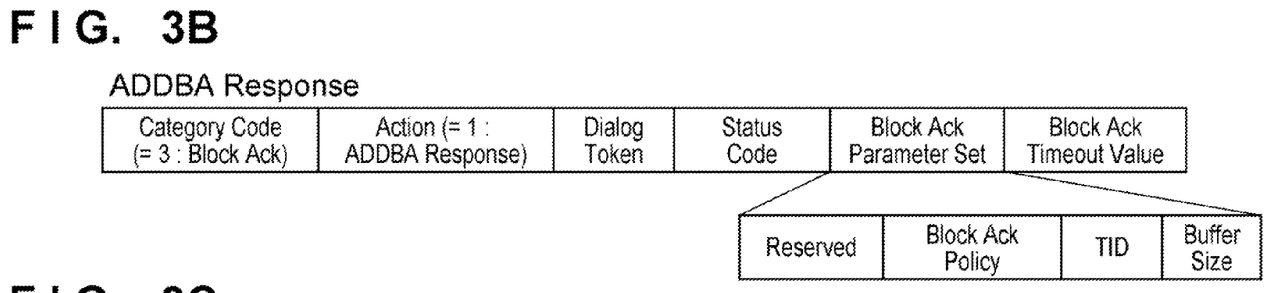

When transmitting an A-MPDU frame to the wireless LAN device 101, first of all, the access point 201 transmits an ADDBA Request to the wireless LAN device 101 to issue a Block Ack stream establishment request. An ADDBA Request is an Action Frame defined in IEEE802.11e, and a frame in the format shown in FIG. 3A. Upon receiving ADDBA Request via the wireless communication unit 106, the wireless LAN device 101 transmits an ADDBA Response as a response to the request. An ADDBA Response is an Action Frame defined in IEEE802.11e, and a frame in the format shown in FIG. 3B. When permitting the establishment of a Block Ack stream, the wireless communication unit 106 returns an ADDBA Response with Status Code being set to SUCCESS (=38). When not permitting the establishment of a Block Ack stream, the wireless communication unit 106 returns Status Code as DECLINED (=37). Assume that in this embodiment, in the normal mode, the wireless communication unit 106 always returns an ADDBA Response with Status Code being set to SUCCESS in response to ADDBA Request from the access point 201.

By exchanging an ADDBA Request and an ADDBA Response a Block Ack stream is established. The access point 201 is then ready for transmitting an aggregation frame to the wireless LAN device 101. When a Block Ack stream is established, the wireless communication unit 106 notifies the system control unit 102 of the establishment of the Block Ack stream. The system control unit 102 stores, in the system storage unit 103, information indicating that the Block Ack stream is being established.

After the Block Ack stream is established, the access point 201 can transmit an aggregation frame instead of a single frame to the wireless LAN device 101. Upon receiving an aggregation frame, the wireless communication unit 106 divides the received aggregation frame into subframes. The wireless communication unit 106 then transmits each divided subframe to the system storage unit 103 via the interface unit 105, and notifies the system control unit 102 of the corresponding information. Upon receiving the notification, the system control unit 102 executes protocol processing higher than the network layer for each subframe stored in the system storage unit 103. Note that FIG. 3C will be described later.

Figure 4:
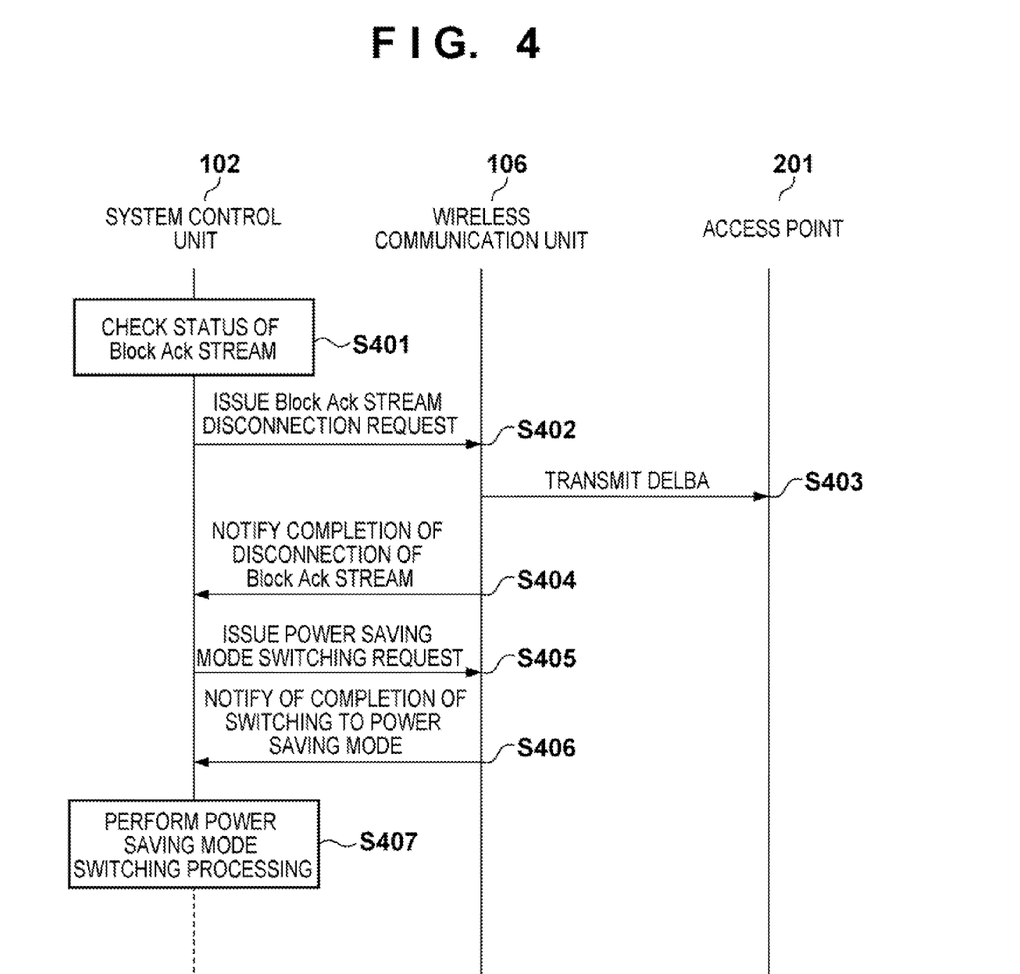
FIG. 4 is a view showing a method of switching from the normal mode to the power saving mode according to the first or second embodiment.

Switching processing from the normal mode to the power saving mode of the wireless LAN device 101 will be described with reference to FIG. 4. The wireless LAN device 101 in the normal mode switches from the normal mode to the power saving mode when no request is issued from the network and no processing necessary in the system control unit 102 occurs for a predetermined period of time.

In step S401, the system control unit 102 executes status confirmation processing for a Block Ack stream. More specifically, the system control unit 102 reads out the status of a Block Ack stream from the system storage unit 103 to check whether a Block Ack stream has already been established. If a Block Ack stream has not been established, the system control unit 102 executes processing from step S405 without executing processing in steps S402, S403, and S404.

In step S402, if a Block Ack stream has been established in step S401, the system control unit 102 issues a Block Ack stream disconnection request to the wireless communication unit 106.

Figure 3C:
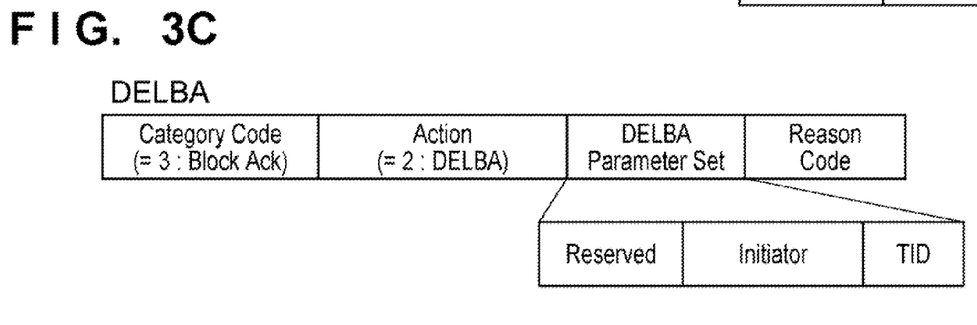

In step S403, the wireless communication unit 106 transmits DELBA as an Action Frame defined in IEEE802.11e to the access point 201 upon receiving a Block Ack stream disconnection request from the system control unit 102 in step S402. That is, the wireless communication unit 106 transmits a transmission stop request to the access point 201. FIG. 3C shows the frame format of DELBA.

Upon receiving DELBA, the access point 201 determines that the Block Ack stream is disconnected, and transmits no aggregation frame. When transmitting an aggregation frame again, the access point 201 transmits an ADDBA Request (reception request) to the wireless LAN device 101. The access point 201 cannot transmit an aggregation frame until an ADDBA Response is returned from the wireless LAN device 101 and a Block Ack stream is established again.

Upon transmitting DELBA in step S403, the wireless communication unit 106 notifies the system control unit 102 of the completion of disconnection of the Block Ack stream in step S404. Upon receiving the notification of the completion of disconnection of the Block Ack stream, the system control unit 102 updates the status of the Block Ack stream held in the system storage unit 103.

In step S405, the system control unit 102 requests the wireless communication unit 106 to switch from the normal mode to the power saving mode.

In step S406, the wireless communication unit 106 switches from operation in the normal mode to operation in the power saving mode, and notifies the system control unit 102 of the corresponding information.

In step S407, upon receiving the notification indicating that the normal mode has been switched to the power saving mode from the wireless communication unit 106, the system control unit 102 performs power saving mode switching processing to set a state in which power consumption is reduced. More specifically, the system control unit 102 decreases its clock frequency. In addition, the application processing unit 104 stops processing to reduce power consumption. If the system storage unit 103 is a DRAM (Dynamic Random Access Memory), it is also possible to suppress power consumption by setting Self-Refresh mode or the like. Upon performing these processes, the system control unit 102 completes the power saving mode switching processing, and the wireless LAN device 101 operates in the power saving mode.

The operation of the wireless LAN device 101 in the power saving mode will be described next. In the power saving mode, the wireless communication unit 106 waits for a request from another device. The system control unit 102 and the application processing unit 104 execute no specific processing. Upon receiving a frame which can be processed only on the data link layer, the wireless communication unit 106 performs processing by itself, but neither transfers the frame to the system storage unit 103 nor notifies the system control unit 102. Note, however, that if there is information to be notified to the system control unit 102, for example, information indicating disconnection from the access point 201, the wireless LAN device 101 switches from the power saving mode to the normal mode to notify the system control unit 102 of the corresponding information. Upon receiving a frame which needs to be processed on a layer higher than the data link layer, for example, an ARP request or a TCP connection request, the wireless LAN device 101 switches from the power saving mode to the normal mode to perform the corresponding processing.

Figure 5:
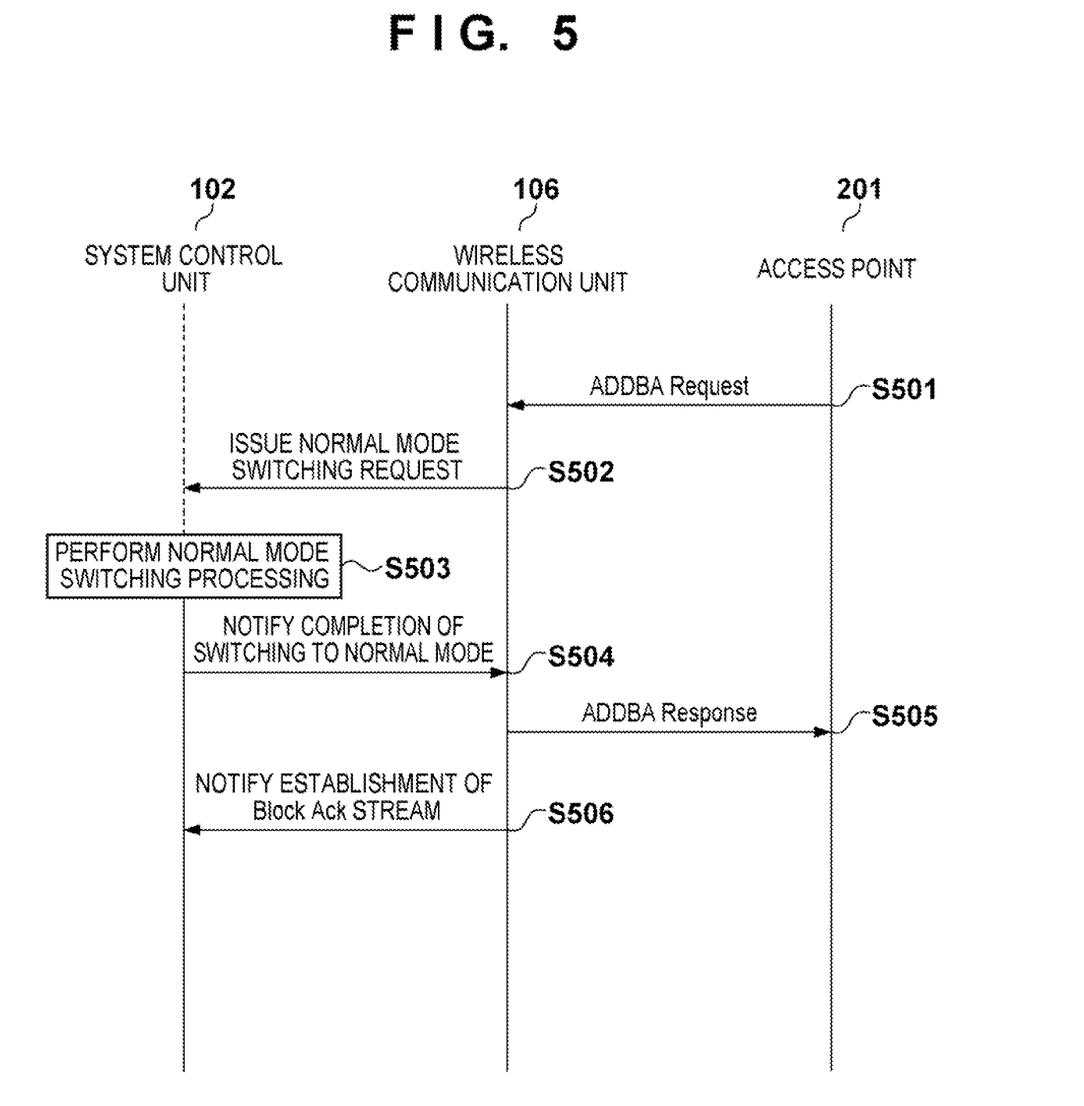
FIG. 5 is a view showing a method of switching from the power saving mode to the normal mode according to the first embodiment.

Processing to be performed when the wireless LAN device 101 receives an ADDBA Request from the access point 201 in the power saving mode will be described with reference to FIG. 5. Upon receiving an ADDBA Request, the wireless LAN device 101 switches to the normal mode.

First of all, in step S501, upon receiving an ADDBA Request from the access point 201 via the wireless communication unit 106, the wireless LAN device 101 notifies the system control unit 102 of a normal mode switching request.

In step S502, the system control unit 102 receives the normal mode switching request from the wireless communication unit 106.

In step S503, the system control unit 102 executes normal mode switching processing. In the normal mode switching processing, the system control unit 102 increases its clock frequency and activates the application processing unit 104. If the system storage unit 103 is in Self-Refresh mode, the system control unit 102 restores the system storage unit 103 to a state in which it allows normal access. With these processes, the wireless LAN device 101 switches to the normal mode.

In step S504, upon completion of switching to the normal mode, the system control unit 102 notifies the wireless communication unit 106 of the completion of switching to the normal mode.

In step S505, upon receiving the notification of the completion of switching to the normal mode in step S504, the wireless communication unit 106 transmits an ADDBA Response to the access point 201 as a response to the ADDBA Request received in step S501. At this time, the wireless communication unit 106 sets the Status Code of the ADDBA Response to SUCCESS to permit the establishment of a Block Ack stream. With the above processing, the wireless communication unit 106 establishes a Block Ack stream with the access point 201.

In step S506, upon establishment of a Block Ack stream in step S505, the wireless communication unit 106 notifies the system control unit 102 of the completion of establishment of the Block Ack stream. Upon receiving the notification of completion of the Block Ack stream, the system control unit 102 holds the current status of the Block Ack stream in the system storage unit 103.

With the above processing, upon receiving an ADDBA Request during the power saving mode, the wireless LAN device 101 completes the establishment of a Block Ack stream upon switching to the normal mode first, and then receives an aggregation frame in the normal mode.

The first embodiment can prevent frame loss by receiving an aggregation frame in the power saving mode upon switching between the normal mode and the power saving mode in the above manner. That is, it is possible to prevent the access point 201 from transmitting any aggregation frame after switching to the power saving mode by disconnecting a Block Ack stream before switching from the normal mode to the power saving mode in step S403. In addition, when an ADDBA Request is received during the power saving mode, the power saving mode is switched to the normal mode before the completion of establishment of a Block Ack stream. This can prevent any aggregation frame from being transmitted during the power saving mode and avoiding frame loss.

Second Embodiment

Figure 6:
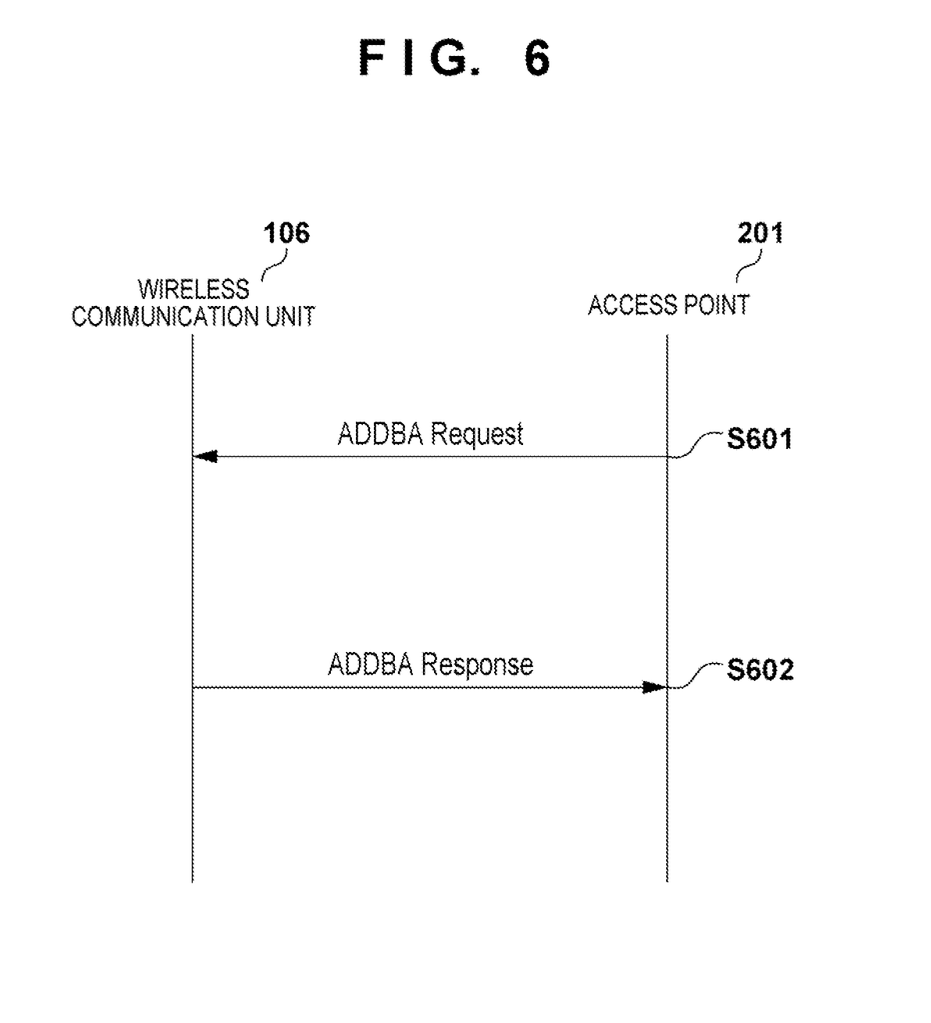
FIG. 6 is a view showing a method of switching from the power saving mode to the normal mode according to the second embodiment.

A method of switching from the power saving mode to the normal mode according to the second embodiment will be described with reference to FIG. 6.

A wireless LAN device according to the second embodiment has the same arrangement as that of the wireless LAN device 101 described with reference to FIG. 1, and the network in which the wireless LAN device 101 participates is the same as that described with reference to FIG. 2. Processing to be performed when the wireless LAN device 101 is switched from the normal mode to the power saving mode is the same as that described with reference to FIG. 4. A description of them will therefore be omitted.

Described first is the processing to be performed by a wireless LAN device 101 upon reception of an ADDBA Request from an access point 201 during the power saving mode according to the second embodiment.

In step S601, a wireless communication unit 106 receives an ADDBA Request from the access point 201.

In step S602, upon receiving the ADDBA Request in step S601, the wireless communication unit 106 returns an ADDBA Response with Status Code being set to DECLINED to the access point 201. That is, the wireless communication unit 106 denies the establishment of a Block Ack stream with the access point 201 during the power saving mode. The wireless communication unit 106 then operates while maintaining the power saving mode without notifying the system control unit 102 of the reception of the ADDBA Request from the access point 201.

As described above, the wireless communication unit 106 inhibits the establishment of a Block Ack stream upon receiving an ADDBA Request during power saving mode, and hence receives no aggregation frame during the power saving mode.

According to this embodiment, even if the access point 201 transmits an aggregation frame to the wireless LAN device 101 during the power saving mode, no aggregation frame loss occurs in the wireless LAN device 101.

Third Embodiment

Figure 7:
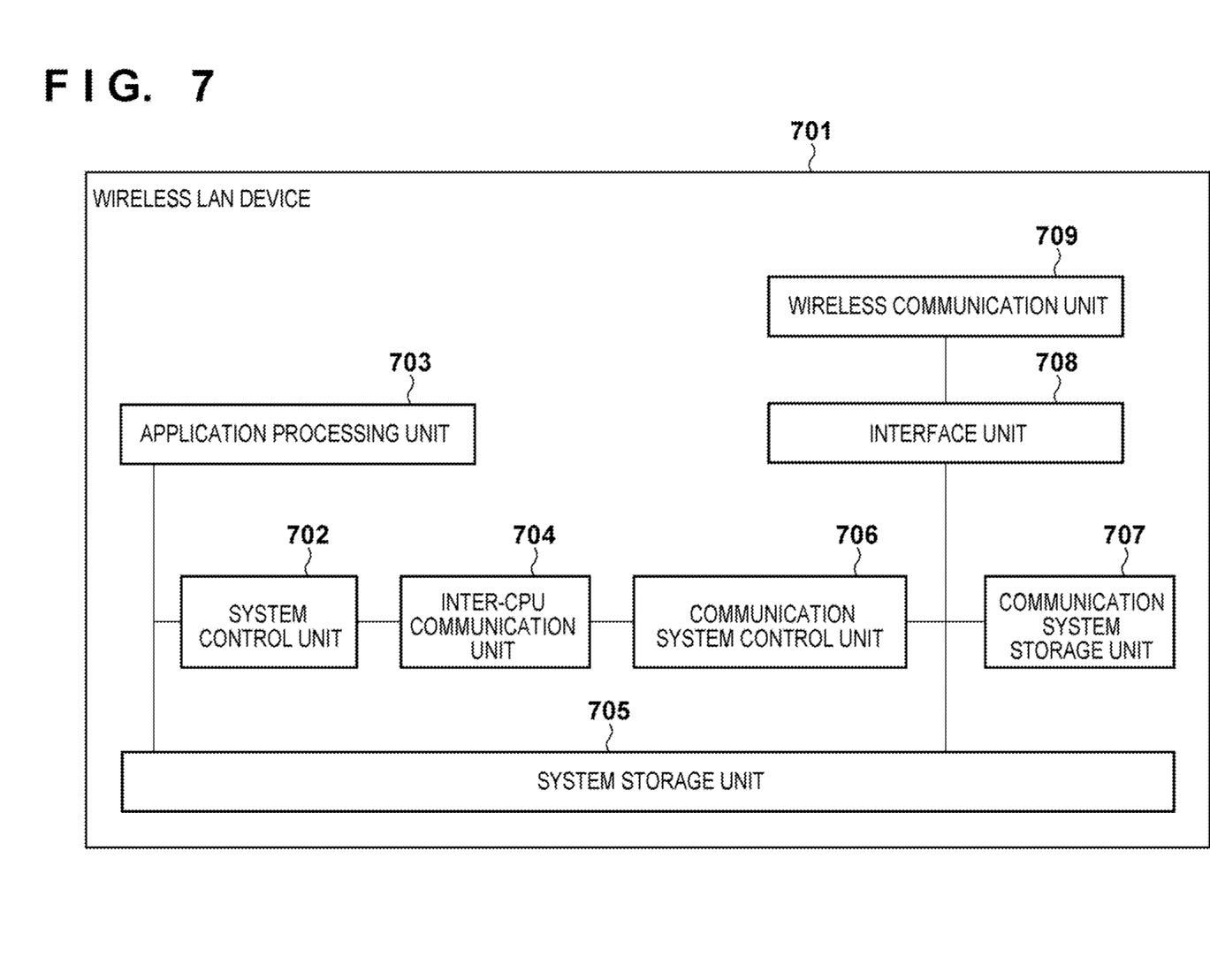
FIG. 7 is a block diagram showing the arrangement of a wireless LAN device according to the third or fourth embodiment.

The arrangement of a wireless LAN device 701 according to the third embodiment will be described with reference to FIG. 7. The wireless LAN device 701 is a communication device capable of performing wireless LAN communication based on IEEE802.11n. The wireless LAN device 701 includes a system control unit 702, an application processing unit 703, an inter-CPU communication unit 704, a system storage unit 705, a communication system control unit 706, a communication system storage unit 707, an interface unit 708, and a wireless communication unit 709.

The system control unit 702 is a CPU which controls the overall wireless LAN device 701 by executing programs stored in the system storage unit 705. The application processing unit 703 is a hardware apparatus required for the wireless LAN device 701 to execute application processing like the application processing unit 104 of the first embodiment.

The inter-CPU communication unit 704 is a hardware apparatus for inter-CPU communication between the system control unit 702 and the communication system control unit 706. When the system control unit 702 writes data in the inter-CPU communication unit 704, an interrupt occurs in the communication system control unit 706 to allow the communication system control unit 706 to read out the written data. Likewise, the communication system control unit 706 can notify the system control unit 702 of the data. The system storage unit 705 is a RAM in which a program executed by the system control unit 702 and the data necessary for the execution of the program are stored. The system storage unit 705 also stores frames received by the wireless communication unit 709 in the normal mode.

The communication system control unit 706 is a CPU which controls the wireless communication unit 709 via the interface unit 708 by executing programs stored in the communication system storage unit 707. The communication system storage unit 707 is a RAM in which a program executed by the communication system control unit 706 and the data necessary for the execution of the program are stored. In addition, the communication system storage unit 707 stores frames received by the wireless communication unit 709 in the power saving mode. The interface unit 708 is an interface for connecting the communication system control unit 706 to the wireless communication unit 709, and is, for example, a USB or PCI Express interface, like the interface unit 105 in the first embodiment. Like the wireless communication unit 106 in the first embodiment, the wireless communication unit 709 is a wireless LAN adapter including a USB interface or a PCI Express type wireless LAN card.

Figure 2:
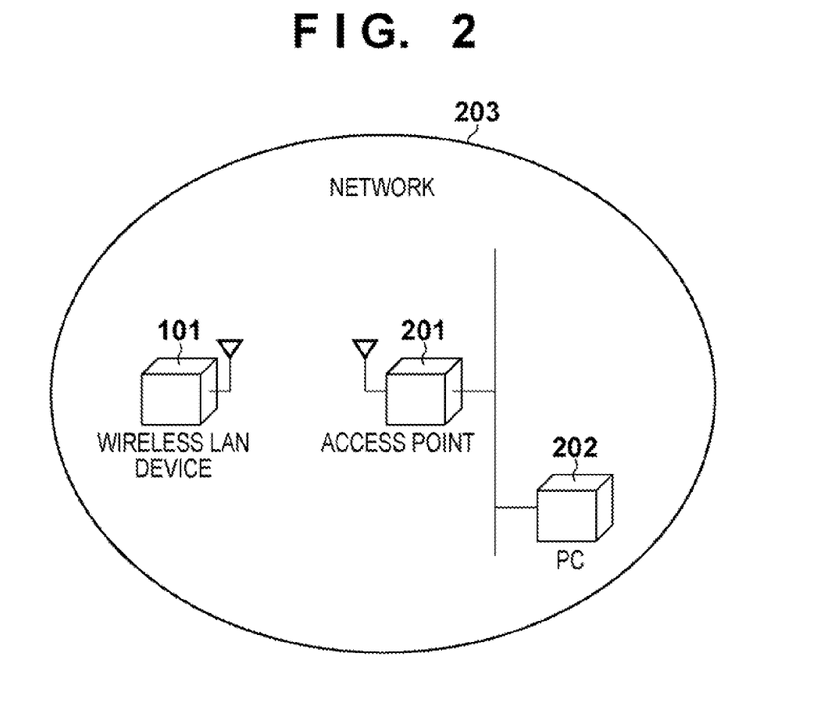
FIG. 2 is a view showing the arrangement of a network according to the first to fourth embodiments.

FIG. 2 shows the network in which the wireless LAN device 701 participates. This network arrangement is the same as that in the first embodiment, and hence a description of it will be omitted.

The wireless LAN device 701 has the normal mode and the power saving mode. The wireless LAN device 701 switches to the power saving mode when no communication occurs from an access point 201 or a PC 202 for a predetermined period of time. When communication occurs from the access point 201 or the PC 202, the wireless LAN device 701 operates upon switching from the power saving mode to the normal mode, as needed.

In the wireless LAN device 701, in the normal mode, the communication system control unit 706 controls the wireless communication unit 709 and performs processing based on TCP/IP protocol. The system control unit 702 executes communication processing with the access point 201 or the PC 202 by performing processing on a layer higher than TCP/IP protocol. More specifically, the wireless communication unit 709 processes frames which can be processed on the data link layer. Upon receiving a frame which cannot be processed on the data link layer alone such as TCP/IP protocol frames, the wireless communication unit 709 transfers the frame to the system storage unit 705 via the interface unit 708, and notifies the communication system control unit 706 of the corresponding information. The communication system control unit 706 performs TCP/IP protocol processing for the frame, and performs processing on a layer higher than TCP/IP.

In the third embodiment, the communication system control unit 706 manages the status information of a Block Ack stream. That is, upon receiving an ADDBA Request from the access point 201, the wireless communication unit 709 notifies the communication system control unit 706 of the ADDBA Request. The communication system control unit 706 stores, in the communication system storage unit 707, information indicating that the Block Ack steam has been established.

Figure 8:
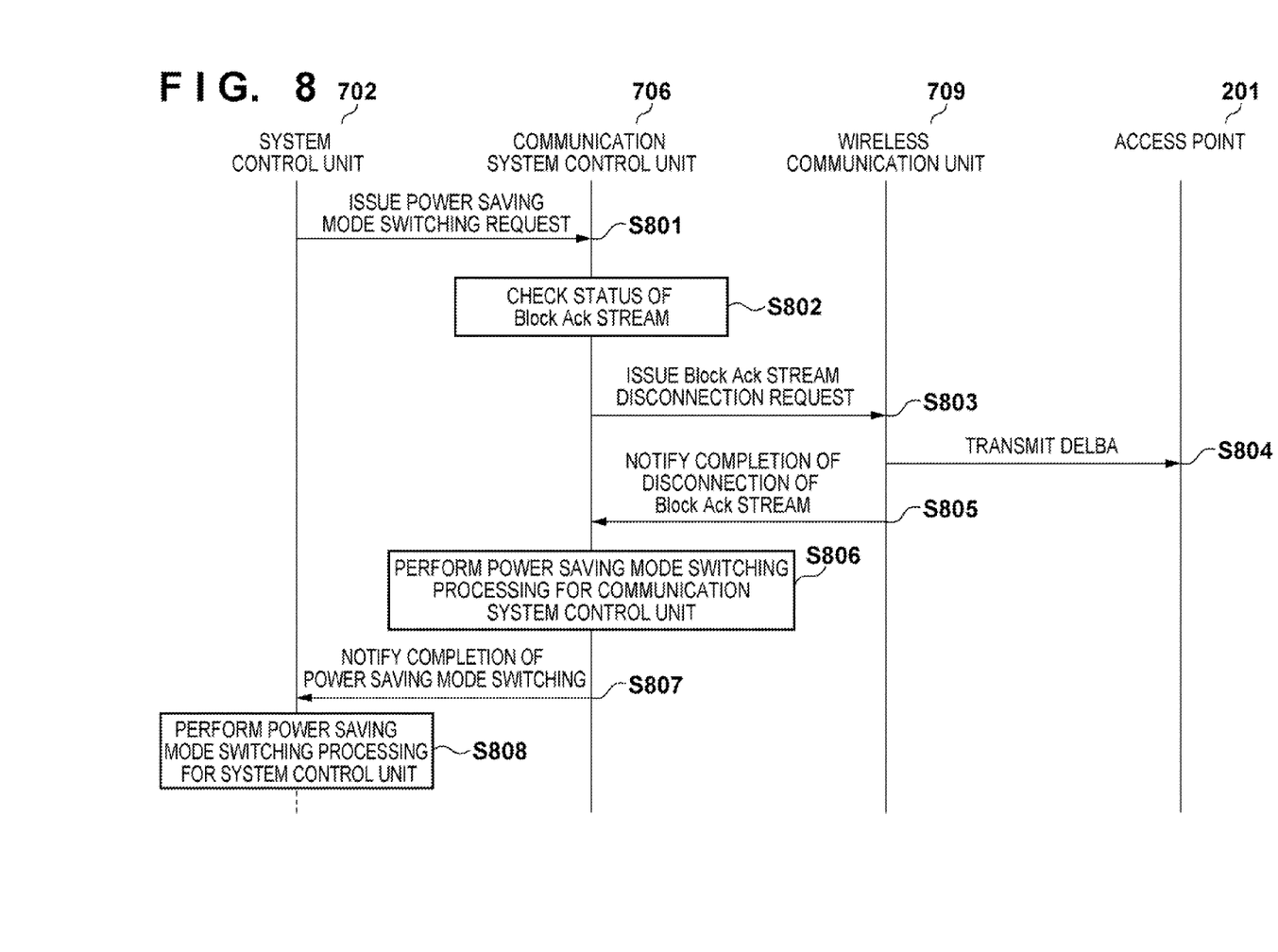
FIG. 8 is a view showing a method of switching from the normal mode to the power saving mode according to the third or fourth embodiment.

Processing to be performed when the wireless LAN device 701 switches from the normal mode to the power saving mode will be described with reference to FIG. 8.

In step S801, first of all, the system control unit 702 notifies the communication system control unit 706 of an instruction to switch to the power saving mode.

In step S802, upon receiving a power saving mode switching request in step S801, the communication system control unit 706 reads out corresponding information from the communication system storage unit 707, and checks the status of a Block Ack stream. If a Block Ack stream has not been established, the communication system control unit 706 does not execute the processing from step S803 to step S805. The following description is based on the assumption that a Block Ack stream has been established.

In step S803, the communication system control unit 706 issues a Block Ack stream disconnection request to the wireless communication unit 709.

In step S804, upon receiving the request in step S803, the wireless communication unit 709 transmits a DELBA to the access point 201 to cancel the Block Ack stream. FIG. 3C shows the arrangement of a DELBA frame. Transmitting the DELBA will cancel the Block Ack stream.

When the Block Ack stream is canceled in step S804, the wireless communication unit 709 notifies the communication system control unit 706 of the completion of disconnection of the Block Ack stream in step S805.

Upon receiving the notification of the completion of the Block Ack stream disconnection in step S805, the communication system control unit 706 performs processing for switching to the power saving mode in step S806. More specifically, the communication system control unit 706 notifies the interface unit 708 of an instruction to change the transfer destination of the frame received by the wireless communication unit 709 from the system storage unit 705 to the communication system storage unit 707. After this, received frames are stored in the communication system storage unit 707 instead of the system storage unit 705.

In step S807, upon completion of power saving mode switching processing, the communication system control unit 706 notifies the system control unit 702 of the completion of switching to the power saving mode.

In step S808, the system control unit 702 executes power saving mode switching processing. More specifically, the system control unit 702 decreases its clock frequency. In addition, the system control unit 702 stops processing in the application processing unit 703 to reduce power consumption. If the system storage unit 705 is a DRAM, it is possible to suppress power consumption by setting Self-Refresh mode. With these processes, the system control unit 702 completes the power saving mode switching processing, and the wireless LAN device 701 operates in the power saving mode.

The operation of the wireless LAN device 701 in the power saving mode will be described next. Upon receiving a frame which can be processed by only the communication system control unit 706 and the wireless communication unit 709, the wireless LAN device 701 processes the frame while maintaining the power saving mode. If, for example, the PC 202 receives an ARP request, the communication system control unit 706 controls the wireless communication unit 709 to transmit a response to the ARP request to the PC 202. If the connection with the access point 201 is disconnected or a frame which needs to be processed by the system control unit 702 is received, the wireless LAN device 701 switches from the power saving mode to the normal mode and notifies the system control unit 702 of the corresponding information. Processing to be performed when the wireless LAN device 701 receives an ADDBA Request from the access point 201 during the power saving mode will be described with reference to FIG. 9.

Figure 9:
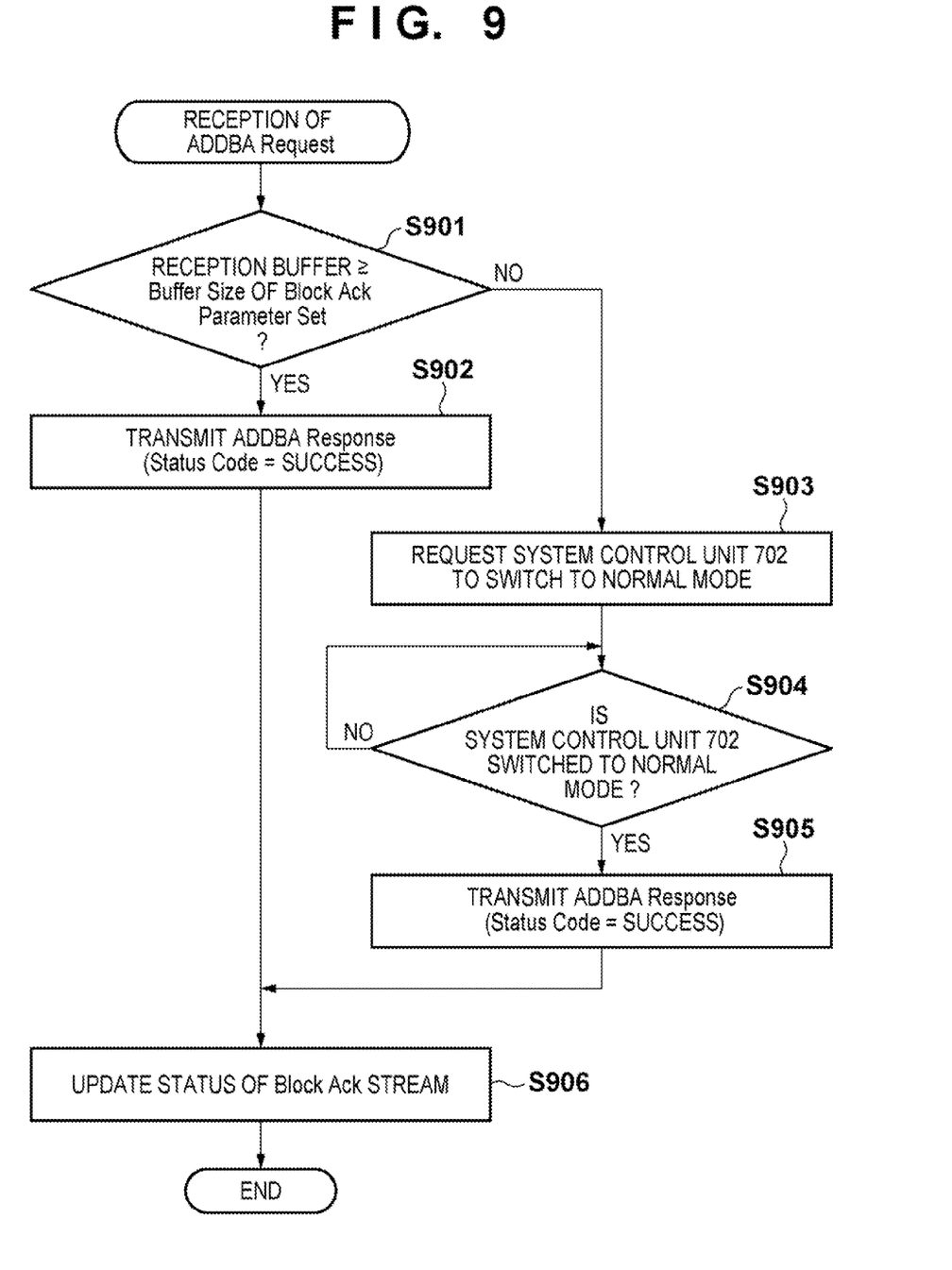
FIG. 9 is a view showing a method of switching from the power saving mode to the normal mode according to the third embodiment.

First of all, in step S901, the communication system control unit 706 compares the reception buffer size for the power saving mode which is secured in the communication system storage unit 707 with the Buffer Size element of Block Ack Parameter Set added as information of the ADDBA Request. If the communication system control unit 706 determines that the reception buffer size for the power saving mode is equal to or more than the element size of Buffer Size (YES in step S901), the process advances to step S902. If the communication system control unit 706 determines that the reception buffer size for the power saving mode is smaller than the element size of Buffer Size (NO in step S901), the process advances to step S903.

In step S902, since an aggregation frame can be received without any loss, the communication system control unit 706 transmits an ADDBA Response with Status Code being set to SUCCESS to the access point 201. This establishes a Block Ack stream. The process then advances to step S906.

In step S906, the communication system control unit 706 updates the status of the Block Ack stream in the communication system storage unit 707.

In step S903, since an aggregation frame may be lost, the communication system control unit 706 notifies the system control unit 702 of an instruction to switch to the normal mode. In response to this notification, the system control unit 702 increases its clock frequency, and activates the application processing unit 703. In addition, the communication system control unit 706 restores the system storage unit 705 to the state in which it allows normal access. Upon completion of switching to the normal mode, the system control unit 702 notifies the communication system control unit 706 of information indicating the completion of switching to the normal mode.

In step S904, after the processing in step S903, the communication system control unit 706 determines whether it has received, from the system control unit 702, a notification of information indicating the completion of switching to the normal mode. If the communication system control unit 706 determines that it has received the notification (YES in step S904), the process advances to step S905. If the communication system control unit 706 determines that it has not received the notification (NO in step S904), the process waits until the communication system control unit 706 receives the notification.

In step S905, upon receiving the notification from the system control unit 702 in step S904, the communication system control unit 706 transmits an ADDBA Response with Status Code being set to SUCCESS to the access point 201 via the wireless communication unit 709. The process then advances to step S906. Returning the ADDBA Response will establish a Block Ack stream. In step S906, the communication system control unit 706 updates the status of the Block Ack stream in the communication system storage unit 707. With the above operation, this processing is terminated.

According to the third embodiment, it is possible to determine whether to establish a Block Ack stream while maintaining the power saving mode or to switch to the normal mode, in accordance with the reception buffer size which can be used during the power saving mode and the buffer size required to receive an aggregation frame. This can prevent aggregation frame loss caused by a small reception buffer size during the power saving mode.

Fourth Embodiment

A wireless LAN device according to the fourth embodiment has the same arrangement as that of the wireless LAN device 701 described with reference to FIG. 7. The network in which the wireless LAN device 701 participates has the same arrangement as that of the network described with reference to FIG. 2. Processing to be performed by the wireless LAN device 701 when the normal mode is switched to the power saving mode is the same as that described with reference to FIG. 8. The description made with reference to each of FIGS. 2, 7, and 8 are the same in content as that made in the third embodiment, and hence the repetition of the same description will be avoided.

Figure 10:
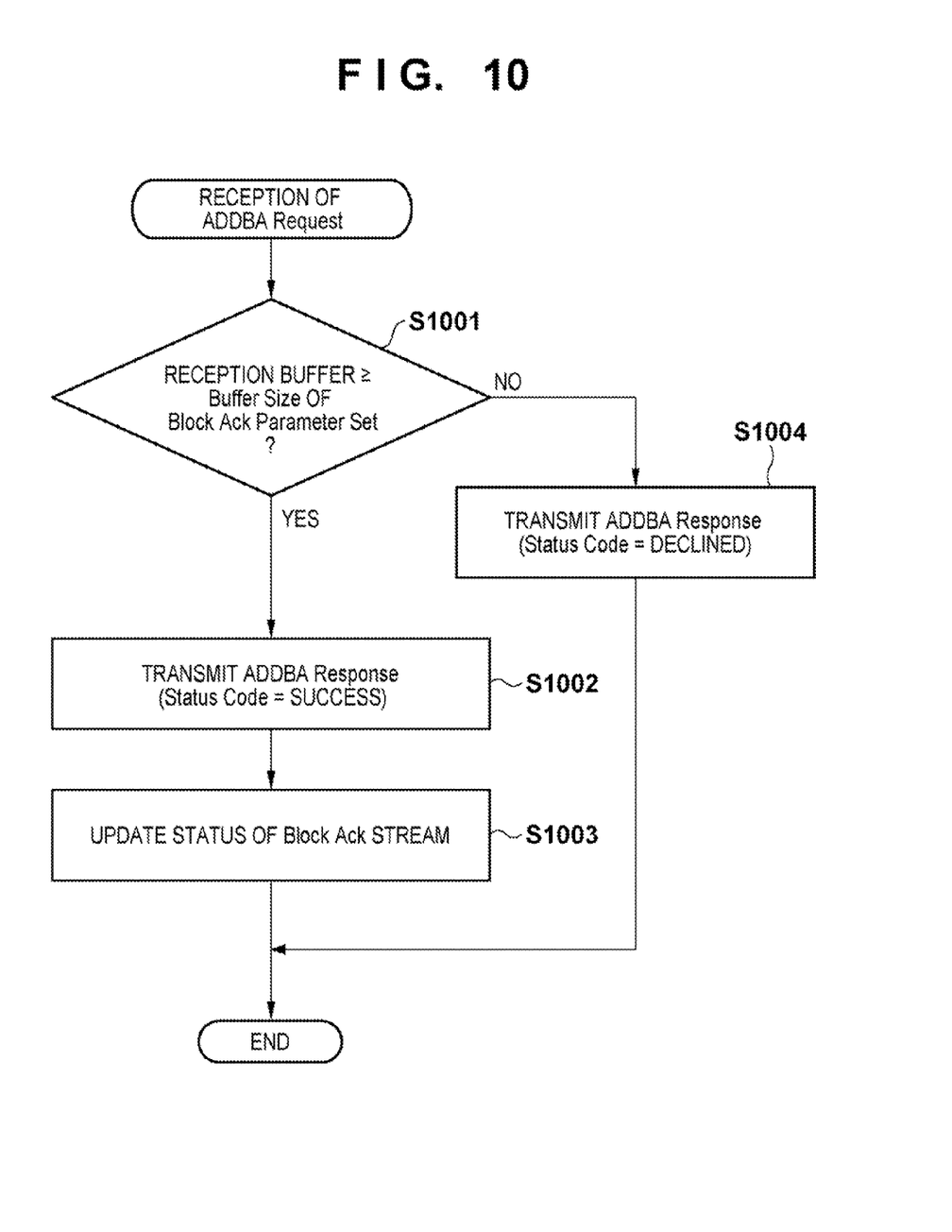
FIG. 10 is a view showing a method of switching from the power saving mode to the normal mode according to the fourth embodiment.

Processing to be performed by the wireless LAN device 701 according to the fourth embodiment when an ADDBA Request is received from an access point 201 during the power saving mode will be described with reference to FIG. 10.

First of all, in step S1001, a communication system control unit 706 compares the reception buffer size for the power saving mode which is secured in a communication system storage unit 707 with the Buffer Size element of Block Ack Parameter Set added as information of the ADDBA Request.

If the communication system control unit 706 determines that the reception buffer size for the power saving mode is equal to or more than the element size of Buffer Size (YES in step S1001), the process advances to step S1002. If the communication system control unit 706 determines that the reception buffer size for the power saving mode is smaller than the element size of Buffer Size (NO in step S1001), the process advances to step S1004.

Since the processing in each of steps S1002 and S1003 is the same as that in each of steps S902 and S906, a description of them will be omitted.

In step S1004, the communication system control unit 706 transmits an ADDBA Response with Status Code being set to DECLINED to the access point 201 via the wireless communication unit 709. With this operation, the communication system control unit 706 denies the establishment of a Block Ack stream, and prevents the access point 201 from transmitting an aggregation frame.

According to the fourth embodiment, this apparatus determines whether to establish a Block Ack stream or deny it, in accordance with the reception buffer size which can be used during the power saving mode and the buffer size required to receive an aggregation frame. This can prevent aggregation frame loss caused by a small reception buffer size during the power saving mode.

According to the present invention, it is possible to reduce the losses of an aggregation frame or continuously transmitted frames while maintaining the power saving mode.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-247840 filed on Nov. 4, 2010, which is hereby incorporated by reference herein in its entirety.

What is claimed is:

1. A communication apparatus comprising:
a processor; and
a memory including instructions that, when executed by the processor, cause the communication apparatus to:
communicate wirelessly with another communication apparatus via a wireless network by using Block Ack which is a response to a plurality of frames; and
request the another communication apparatus to restrict wireless communication which uses the Block Ack in a case where the communication apparatus has transited from a first state to a second state in which power consumption is less than the first state, wherein the first state is a state of making a predetermined function operate and the second state is a state of stopping the predetermined function, and
wherein the communication apparatus communicates wirelessly with the another communication apparatus via the wireless network without using the Block Ack, in accordance with the request.

2. The communication apparatus according to claim 1, wherein the instructions further cause the communication apparatus to receive, from the another communication apparatus, a predetermined signal to communicate wirelessly with another communication apparatus by using the Block Ack while the communication apparatus is in the second state.

3. The communication apparatus according to claim 2, wherein the instructions further cause the communication apparatus to determine whether a size of receiving frames from the another communication apparatus, which is included in the predetermined signal, is smaller than a size of a reception buffer configured to perform reception in the second state.

4. The communication apparatus according to claim 3, wherein the instructions further cause the communication apparatus to permit wireless communication with another communication apparatus using Block Ack while the communication apparatus is in the second state, in a case where the determined size of the receiving frames is smaller than the size of the reception buffer configured to perform reception in the second state.

5. The communication apparatus according to claim 4, wherein the instructions further cause the communication apparatus to permit wireless communication with another communication apparatus by using Block Ack in a case where the communication apparatus is in the first state regardless of the result of the determination.

6. The communication apparatus according to claim 4, wherein the instructions further cause the communication apparatus to deny reception in accordance with the predetermined signal in a case where the determined size of the buffer for the frames is not smaller than the size of the reception buffer configured to perform reception in the second state.

7. The communication apparatus according to claim 2, wherein the instructions further cause the communication apparatus to:
switch the communication apparatus from the second state to the first state in a case where the predetermined signal is received, and
permit wireless communication with another communication apparatus by using Block Ack upon switching to the first state.

8. The communication apparatus according to claim 2, wherein the instructions further cause the communication apparatus to deny reception in accordance with the predetermined signal while the communication apparatus is in the second state.

9. A control method for a communication apparatus, the method comprising:
  communicating wirelessly with another communication apparatus via a wireless network by using Block Ack which is a response to a plurality of frames; and
  requesting the another communication apparatus to restrict wireless communication which uses the Block Ack in a case where the communication apparatus has transited from a first state to a second state in which power consumption is less than the first state,
  wherein the first state is a state of making a predetermined function operate and the second state is a state of stopping the predetermined function, and
  wherein the communication apparatus communicates wirelessly with the another communication apparatus via the wireless network without using the Block Ack, in accordance with the request.

10. A computer-readable non-transitory storage medium storing a computer program for causing a computer to execute a control method for a communication apparatus, the method comprising:
  communicating wirelessly with another communication apparatus via a wireless network by using Block Ack which is a response to a plurality of frames; and
  requesting the another communication apparatus to restrict wireless communication which uses the Block Ack in a case where the communication apparatus has transited from a first state to a second state in which power consumption is less than the first state, wherein the first state is a state of making a predetermined function operate and the second state is a state of stopping the predetermined function, and
  wherein the communication apparatus communicates wirelessly with the another communication apparatus via the wireless network without using the Block Ack, in accordance with the request.

11. The apparatus according to claim 1, wherein the another communication apparatus is requested to restrict wireless communication which uses the Block Ack, using a DELBA signal defined in IEEE802.11 series.

12. The apparatus according to claim 2, wherein the predetermined signal is an ADDBA request defined in IEEE802.11 series.

* * * * *